J. MAHER.
DRAFT INDICATOR.
APPLICATION FILED JAN. 31, 1914.
1,227,285.
Patented May 22, 1917.
2 SHEETS—SHEET 1.
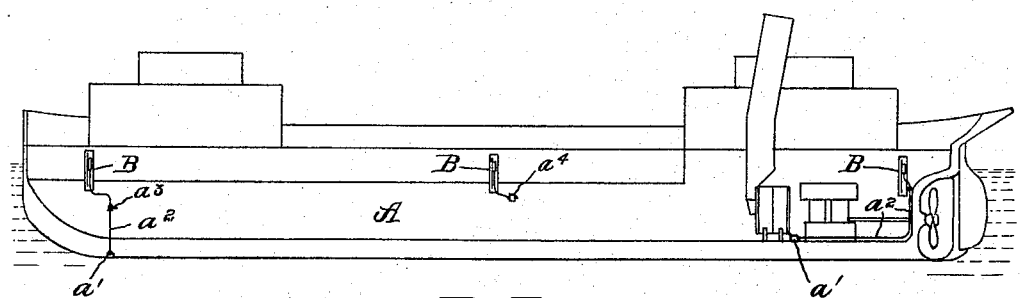
Fig. I.
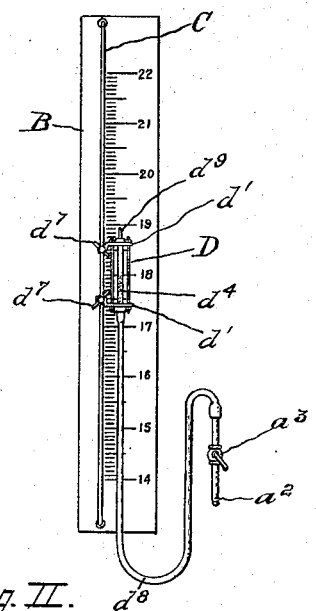
Fig. II.
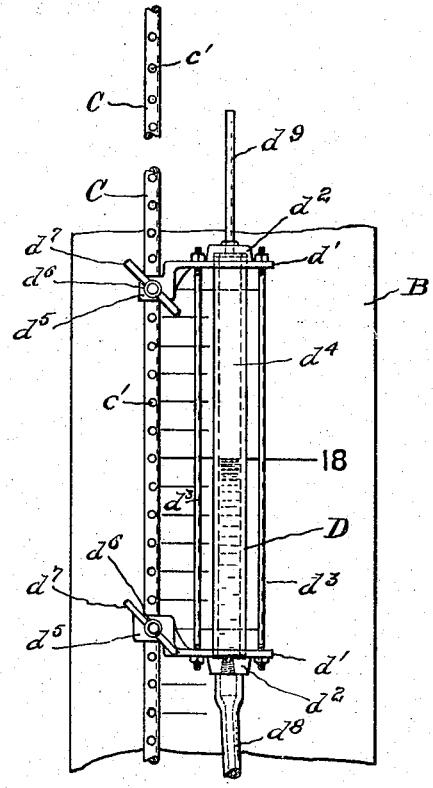
Fig. III.
Witnesses:
Inventor:
John Maher
by Curt B. Mueller,
Attorney

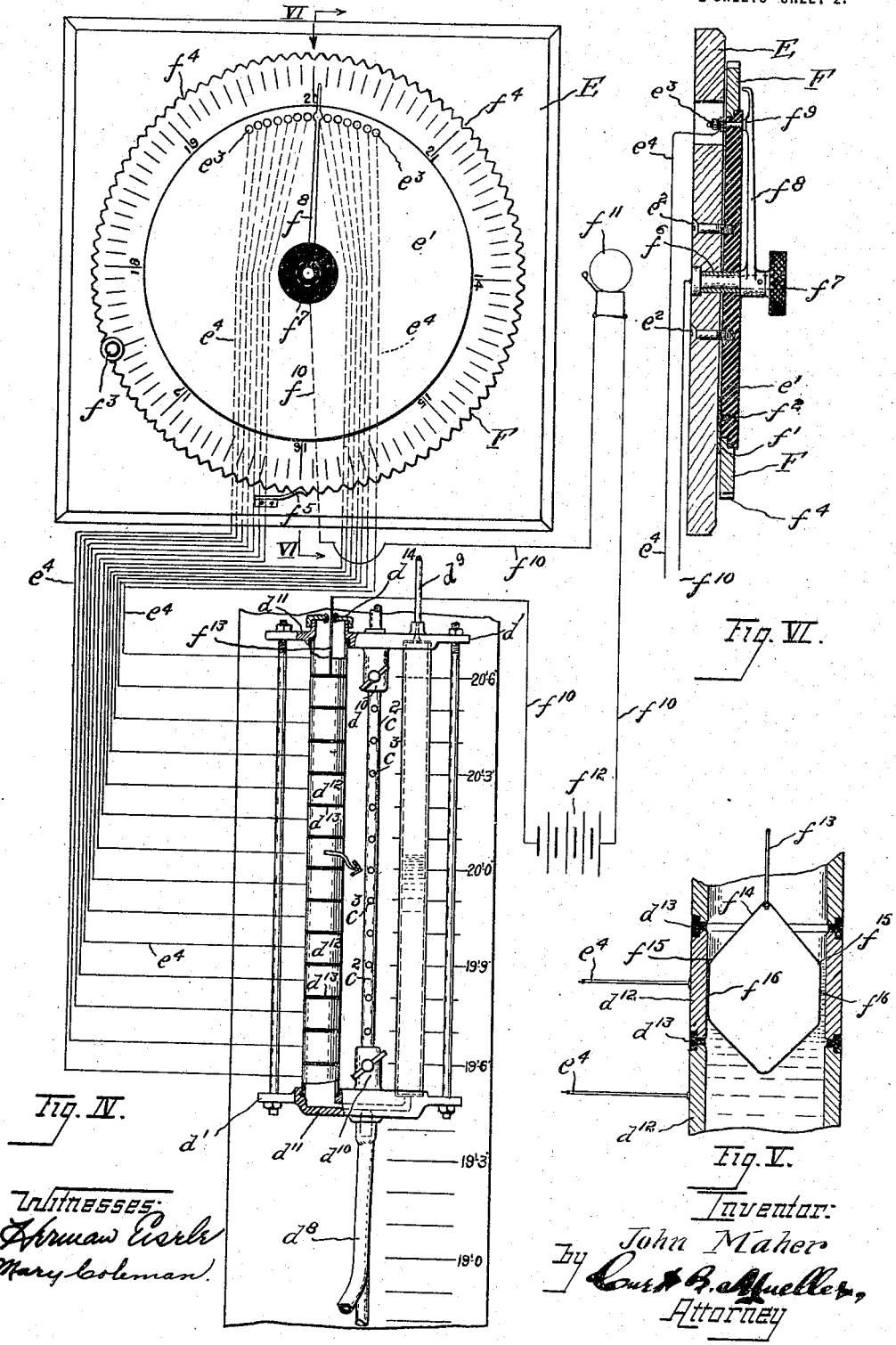

UNITED STATES PATENT OFFICE.

JOHN MAHER, OF CLEVELAND, OHIO; ASSIGNOR OF ONE-FIFTH TO EUGENE QUIGLEY AND ONE-FIFTH TO JOHN J. McKEE, BOTH OF CLEVELAND, OHIO.

DRAFT-INDICATOR.

1,227,285.

Specification of Letters Patent.

Patented May 22, 1917.

Application filed January 31, 1914. Serial No. 815,689.

*To all whom it may concern:*

Be it known that I, JOHN MAHER, a citizen of the United States, residing at Cleveland, in the county of Cuyahoga and State of Ohio, have invented a new and useful Improvement in Draft-Indicators, of which the following is a specification, the principle of the invention being herein explained and the best mode in which I have contemplated applying that principle, so as to distinguish it from other inventions.

This invention has general reference to an indicator purposed to an accurate determination of the existing draft of vessels. More particularly the conception is associated with a contrivance, for satisfactorily accomplishing the results sought, in which certain standardized parts are made adjustable. When combined with optional electric connections and an auxiliary indicator which may be adjusted to correspond, the reading may be reproduced at a commanding location such as the pilot house.

I am well acquainted with the numerous efforts to attain the same object in a more or less similar manner and, therefore, now declare what I believe to be the distinguishing patentable features of my arrangement. To my knowledge the principle heretofore centered has been to set a device so that an aural or visual signal would be annunciated when the water level reached a predetermined height with respect to the vessel. It is often quite important not to exceed a certain draft during loading, and inasmuch as some cargoes are supplied very rapidly this is very apt to occur after the desired draft has been reached. It is, of course, equally desirable not to carry less than the stipulated load or the maximum load in cases where a telegraphic report as to the depth of certain channels must be considered—in short, accuracy is demanded. I have contrived to make possible the annunciation of a signal a little in advance of an arrival at the desired draft, at which time the speed of loading should be checked, and thereafter, such a simple manipulation that the progress of loading thenceforward may be continuously noted at the commanding location. This I have feasibly exemplified in the drawings by an arrangement of a plurality of individual circuits electrically connected respectively with a given indicia upon each of two graduated scales, together with a pair of movable connecting elements adapted to close such circuits successively whenever both come in series with any particular circuit. One of these is moved automatically whereas the other as already suggested is subject to manipulation.

The inventive conception is embodied in means which are hereinafter explained and variously combined in the claims, while the annexed drawing and particular description thereof together set forth in detail certain means constituting my invention, the disclosed means, however, being but one of various mechanical forms in which the principle of my invention may be applied.

Figure I is a longitudinal section of a vessel indicating the manner of attaching my invention with the hull thereof.

Fig. II is an elevation of a simplified form of one detail of my invention as employed for direct readings.

Fig. III is an enlarged view of a part of the construction shown in Fig. II.

Fig. IV is a diagrammatic representation of my complete invention.

Fig. V is an enlarged view of one detail, namely, the automatic circuit closer.

Fig. VI is a section on line VI—VI of the upper part of Fig. IV looking in the direction of the arrows.

Generally speaking, the purpose of an invention such as mine is to make possible the ascertainment of the draft of the vessel without requiring an inspection of the graduations on the exterior of the hull either fore or aft. It is obvious that this latter is often either at night or when the surface of the water is choppy, both uncertain and inconvenient. The simpler form of my invention seen in Figs. II and III is to permit of readings in the hull of the vessel near the sea-cock to which it may be attached. The feature of its arrangement is merely in the provision of a vertically adjustable gage glass and means for precisely supporting such glass in various positions in the direction of alinement of the graduations to be required in conjunction therewith. The advantage of this is to permit of the use of a much smaller, in fact standardized water gage.

With reference first to Fig. I in which the hull of a vessel will be seen designated by the reference letter A and a pair of fore and aft sea-cocks $a'$. I prefer to have these sea-cocks those which are usually provided ready to hand, and they should be non-direct sea-cocks or where the water is not in circulation. Inasmuch as the construction is identical the singular number henceforward will be employed. Connected with the sea-cock $a'$ and extending upwardly therefrom is a pipe length $a^2$ and at the upper extremities of this is a throttle valve $a^3$. Mounted in any suitable manner within the hull A in the neighborhood of the valve $a^3$ is an upright board B having graduated indicia representing feet and inches and arranged to correspond precisely with the draft of the vessel and, of course, also with whatever graduations there may be on the exterior of the hull at that end of the vessel. Extending alongside and in front of the board B is an upright supporting rod C provided with openings $c'$ which are in this instance all spaced an inch apart. A water gage designated in its entirety as D comprises upper and lower opposed brackets $d'$ having upwardly and downwardly projecting hollow bosses $d^2$ and clamping rods $d^3$ adapted to hold firmly seated in opposed recesses (not shown) a glass tube $d^4$. This tube $d^4$ registers in the usual manner with the openings in the bosses $d^2$ and is given a water-tight connection therewith through the medium of any suitable packing. The brackets $d'$ have laterally projecting portions $d^5$, each provided with an opening $d^6$, and spaced apart exactly one foot. It is therefore apparent that thumb-screws $d^7$ may serve to secure the portions $d^5$ and hence the water gage D to any pair of openings $c'$ which are equally spaced, that is, six inches from the existing water level. Below, the opening $d^2$ is connected with the valve $a^3$ through the medium of a flexible hose-length $d^8$. Above, the opening $d^2$ is provided with a constricted open pipe $d^9$ adapted to serve as a vent.

The operation of this application of my invention involves the setting of the water gage so that the middle thereof is about opposite the point corresponding to the draft which it is desired to have the vessel assume. Thereafter, any change in the draft of the vessel may be continuously noted and, when necessary, the water gage as a whole moved upwardly or downwardly as the requirement may be. When the water upon which the vessel is floating is agitated for one reason or another, the fluctuation on the part of the water level in the glass $d^4$ is apt to make the reading difficult if not uncertain. It is to overcome at least in sufficient measure such a disturbance that the throttle valve $a^3$ has been supplied. Fig. I also shows the inclusion of my invention in the middle of the vessel at which place it is, however, not connected with a sea-cock below but with a hole $a^4$ in the side of the ship, located just below the loaded line. The draft indicator so placed is intended for use only when the ship is loaded and for the purpose of noting how much the ship has been temporarily distorted by uneven loading. This middle indicator in so far coöperates with the fore and aft indicators in effecting a proper trimming of the vessel so that the bow is somewhat lighter. This middle indicator furthermore assists in determining how much the vessel settles when running.

Adverting now to Sheet Two, and specifically to Fig. IV thereof, it will be seen that the brackets $d'$ are of duplex construction and secured to a rod $c^2$ having openings $c^3$ spaced one inch apart, by means of a middle collar $d^{10}$ corresponding to the portion $d^5$. The upper and lower opposed portions $d^{11}$ on the side of the rod $c^2$ opposite to that of the glass $d^4$ are likewise hollow and in communication with the hose $d^8$. Secured between the portions $d^{11}$ as an alternately superposed arrangement are a plurality of metal tubular sections $d^{12}$ and insulating rings $d^{13}$ recessed interiorly for a purpose to be hereinafter explained. Each of the tubular sections $d^{12}$ should be substantially one inch in height to correspond with the graduations on the board B and the openings $c^3$. The upper portion $d^{11}$ is provided with a removable cap $d^{14}$ having a small central opening as shown in Fig. IV. As will now be readily understood, the water may now seek its level in both the glass $d^4$ and in the composite tubular construction supported between the portions $d^{11}$.

To proceed to the description of such of my invention as is to be remotely located perhaps preferably in the pilot house, it will be seen to comprise a board E to which is secured a dial $e'$ having a central opening. The dial $e'$ is secured to the plate through the medium of screws $e^2$. Near the periphery of the dial $e'$, along an arc of given extent, are a plurality of electrical contacts $e^3$. Each of these contacts is connected with a wire $e^4$ to one of the tube sections $d^{12}$ as seen in Fig. V. Accordingly each of the contacts $e^3$ represents an inch. Loosely inclosing the dial $e'$ is a ring F, also having graduations in feet and inches. This ring is underlapped slightly with respect to the dial $e'$ and held in place by means of an arcuate separating plate $f'$, which is in turn secured to the dial $e'$ by means of screws $f^2$. The ring F is provided with a handle $f^3$ by means of which it may be rotated with respect to the dial $e'$ for a purpose to be presently explained. The periphery of the ring F is furthermore notched or fashioned with serrations $f^4$ whereby the same may be held in place by the action of a pawl $f^5$ arranged to engage the same. Extending through the central opening of the dial $e'$ and an opening in the board E, registering therewith as is well shown in Fig. VI, is a bushing $f^6$. Rotatably mounted in the bushing $f^6$ is a stem $f^7$ having a knurled insulated head. Keyed to the stem $f^7$ intermediately of its head and the dial $e'$, is an index finger $f^8$ provided near its extremity with a contact surface $f^9$. The arrangement is such that the contact $f^9$ may pass successively over the contacts $e^3$ when the index finger $f^8$ is rotated. The inner end of the stem $f^7$ is connected by means of a wire $f^{10}$, first to a bell $f^{11}$ and then with a battery $f^{12}$ and extending to a point above and in line with the opening in the cap $d^{14}$ is there connected with the upper extremity of a rod $f^{13}$ which projects through such opening. This rod should be of a length substantially the same as the height of the water gage. Its lower extremity is loosely connected with the center of the upper tapered surface of a copper float $f^{14}$. The weight of the rod $f^{13}$ should be such that the float is submerged so that the junction $f^{15}$ of its upper tapered surface and side is flush with the surface of the water. The weight of the rod $f^{13}$ because of its loose connection with the float $f^{14}$, will contrive to keep the latter with certainty against one side or the other and prevent possible vibration causing an intermittent contact. The lateral surface $f^{16}$ of the float, should have an extent well in excess of the width of the recesses between adjacent of the sections $d^{12}$ in order to prevent even a momentary obstruction therewith. In this connection it should now be mentioned that the insulating rings $d^{13}$ are recessed to prevent the float coming in contact therewith. By having the float submerged to a definite extent it is possible to know within a half inch accuracy when the water level is so near one of the insulating rings $d^{13}$ that the float $f^{15}$ can contact with each of two adjacent sections $d^{12}$ simultaneously. In other words, if the alarm can be sounded at any moment by bringing the index finger $f^8$ in contact with two adjacent of the contacts $e^3$, then the water level or junction $f^{15}$ must be within a half inch of the particular insulating ring $d^{13}$ which is interposed between the two sections $d^{12}$ corresponding to such pair of adjacent contacts.

It should accordingly be manifest that a plurality of individual circuits are provided, each connected in series, with a battery and a bell, and each of which is capable of being closed either by the rise or fall of the float $f^{13}$ or by the manipulation of the index finger $f^8$ until they both connect in series with the same particular circuit.

The operation of my draft indicator may now be described as follows, assuming that the vessel is light and that it is desired to have the final draft of the vessel at twenty feet and one-half inch, as shown by the water level in Fig. IV and the arrow on the ring F.

The index finger $f^8$ is advisedly first set at say nineteen feet, six inches so that when the vessel has settled, and, therefore, the water in the component tube $d^{12}$ $d^{13}$ risen, and necessarily also the float $f^{13}$ risen to the level of the particular section $d^{12}$ corresponding to and having electrical connection with the particular contact $e^3$ which corresponds to the graduation nineteen feet, six inches on the ring F, the circuit will be automatically closed and the alarm $f^{11}$ annunciated. At such time the person in charge of the loading will have been apprised that the draft of the vessel is approaching that with which it is desired to sail. He thereupon directs a checking of the speed with which the cargo is being supplied, at the same time readjusting the index finger $f^8$ more closely toward twenty feet and one-half inch. When the float $f^{13}$ presently reaches so as to have contact with the particular section $d^{12}$ which is a part of the circuit which the index finger then forms a part of, the alarm $f^{11}$ will be again annunciated. As will now be perceived, the possibility is afforded of ascertaining at any time just what the momentary draft of the vessel is. This procedure merely involves moving the index finger $f^8$ to the left from one contact $e^3$ to the next until the signal is sounded. By calculating the relation of certain time intervals, the rate at which the cargo is being supplied can at any time be known. In practice the vessel is loaded with the maximum draft conducive to good sailing qualities and at the same time dependent upon the shallowness of specific channels through which the vessel will pass on schedule time. For example, if the vessel is to pass through one of the canals the draft of the vessel may be fixed somewhat in excess of the depth of such canal on the theory that by the time the vessel is passing therethrough the reduction in the fuel supply will have compensated for such excess. The essence of my conception will now be perceived as involving not only precision but facility in determining at any time and for any purpose just what the draft of the vessel at any one of a number of locations may be.

I claim:

1. A draft indicator comprising the combination with a vessel, of a scale having graduated indicia corresponding with the depth of the hull, a member supported adjacent said scale and provided with openings spaced as said indicia, and a water gage communicating through said hull, said gage carrying projections adapted to coöperate with different pairs of such openings whereby an adjustment in the direction of alinement of said graduations may be effected.

2. A draft indicator comprising the combination with a vessel, of an upright member having graduations coinciding with the draft of the vessel, a water gage extending alongside of said member and adjustable in the direction of alinement of said graduations, means for fixing said gage in various positions, a sea-cock for controlling communication through the hull of the vessel, said gage adapted to communicate with the water through said cock, and a valve positioned intermediately of said sea-cock and gage and adapted to throttle such communication.

3. A draft indicator comprising the combination of the hull of a vessel, a member having graduations coinciding with the draft of such hull, a bar extending alongside said member and having openings spaced as said graduations, a water gage in open communication through said hull and having laterally projecting portions at opposite ends, and means for securing said portions in various positions in different pairs of said openings whereby the middle of said gage assumes a predetermined position.

4. A draft indicator comprising the combination of the hull of a vessel, a plate having graduations coinciding with the true draft of such hull, a bar extending alongside said member and provided with openings definitely spaced with respect to said graduations, a water gage in open communication through said hull and having laterally projecting brackets, such brackets being spaced as said openings, and thumbscrews for securing said brackets at different pairs of said openings.

5. A draft indicator comprising the combination with a hull, of an electric circuit including in series, a source of energy, a signal, a manually operable switch, a water container in communication through such hull and provided with a column of superposed terminals, and a float adapted to contact laterally with all of said terminals, and weighting means carried by said float and bodily movable with it past said terminals whereby the float is tilted against some particular terminal.

6. A draft indicator comprising the combination with a hull, of an electric circuit including in series, a source of energy, a signal, a water container in communication through such hull and provided with a terminal, a float adapted to contact with said terminal, and means for adjusting said container in the direction of its axis with respect to the position of said float.

7. A draft indicator comprising the combination with a hull, of an electric circuit including in series, a source of energy, a signal, a water tube in open communication through said hull and having a band constituting a terminal, a copper float in said tube and a rod loosely connected with said float and adapted to hold it against said band.

8. A draft indicator comprising an electric circuit including a source of energy and a signal, a tube having open water communication and provided with electrical terminals corresponding to and indicating actual graduated draft indicia, a switch-board having electrical contacts corresponding to and indicating said terminals respectively, a switch adapted to successively rub said switch-board contacts, and a float adapted to rub said tube terminals, whereby successive annunciations of said signal may be definitely interpreted.

9. A draft indicator comprising the combination with the hull of a vessel, of an electric circuit including in series; a source of energy, a water container in communication through such hull, said container including a plurality of superposed and insulated sections, each of said sections constituting a terminal, and means including a float in said container adapted to effect contact with said terminals.

10. A draft indicator comprising the combination with the hull of a vessel and an upright member mounted therein and having graduations corresponding with the true draft of the vessel, of an electric circuit including; a source of energy, a hollow bracket in communication through said hull and adjustable along said upright member, a tube carried by and in communication through said bracket, said tube having a plurality of terminals, and means including an electrically connected float adapted to effect contact with said terminals.

11. A draft indicator comprising the combination with the hull of a vessel, of an upright tube having communication therethrough, said tube having a plurality of terminals associated therewith, means for adjusting said tube whereby said terminals correspond with actual draft indicia of the vessel, signals, a plurality of electric circuits corresponding with different of said terminals respectively and each adapted to include a signal, a manually operable switch, and an automatically operating switch including a float in said tube, said switches together adapted to successively close individual of said circuits whereby to annunciate said signal for each indicating terminal depending upon the relative movement of said switches.

12. A draft indicator comprising the combination with a vessel, of a substantially upright member having graduations coinciding with the actual draft indications of the vessel, a water gage extending along the side of said member and adjustable therealong, means for fixing said gage in any one of a number of predetermined positions relative to said indications and an electric current including; a source of energy, a signal, a terminal in said gage and a float adapted to contact said terminal.

Signed by me this 28th day of January, 1914.

JOHN MAHER.

Attested by—
 MARY COLEMAN,
 A. F. SCHLEGEL.

Copies of this patent may be obtained for five cents each, by addressing the "Commissioner of Patents, Washington, D. C."